United States Patent [19]
Gordon

[11] Patent Number: 4,612,217
[45] Date of Patent: Sep. 16, 1986

[54] COATING PROCESS FOR MAKING NON-IRIDESCENT GLASS STRUCTURE

[76] Inventor: Roy G. Gordon, c/o Thompson, Birch, Gauthier & Samuels, 225 Franklin St., Boston, Mass. 02110

[21] Appl. No.: 798,467

[22] Filed: Nov. 15, 1985

Related U.S. Application Data

[62] Division of Ser. No. 519,248, Aug. 10, 1983, Pat. No. 4,595,634.

[51] Int. Cl.⁴ ............................................. B05D 5/06
[52] U.S. Cl. .................... 427/255.1; 65/3.11; 65/3.12; 65/3.31; 65/60.1; 427/165; 427/166; 427/167; 427/255.2; 427/255.3; 427/407.2
[58] Field of Search ............. 428/426, 34; 65/60.1, 65/3.31, 3.11, 3.12; 427/255.1–255.3, 165–167, 407.2

[56] References Cited

U.S. PATENT DOCUMENTS

| 4,146,657 | 3/1979 | Gordon | 427/255.3 |
| 4,187,336 | 2/1980 | Gordon | 428/34 |
| 4,206,252 | 6/1980 | Gordon | 427/255.2 |

Primary Examiner—Edith Buffalow
Attorney, Agent, or Firm—Andrew F. Kehoe

[57] ABSTRACT

This disclosure describes a novel method of coating a substrate, e.g., a transparent glass substrate, with a very thin inorganic coating of predetermined varying composition, e.g. an electrically-conductive tin oxide coating. The coating is carried out in such a way that quality control problems associated with leakage of the coating reactants from the reaction zone are virtually eliminated. The resulting coating can exhibit excellent non-iridescent properties even at thicknesses well below on micrometer.

11 Claims, 7 Drawing Figures

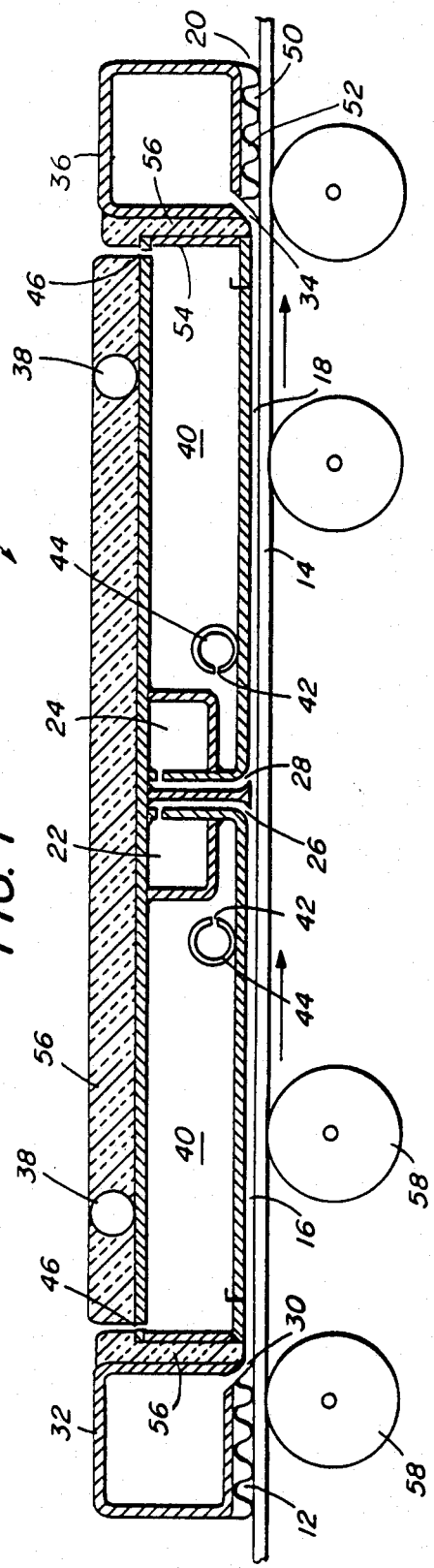
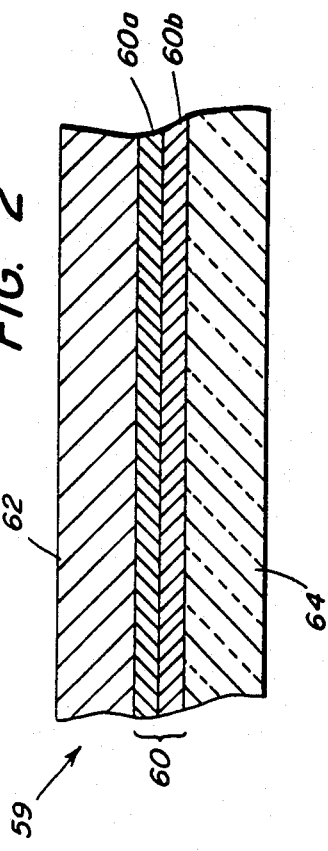

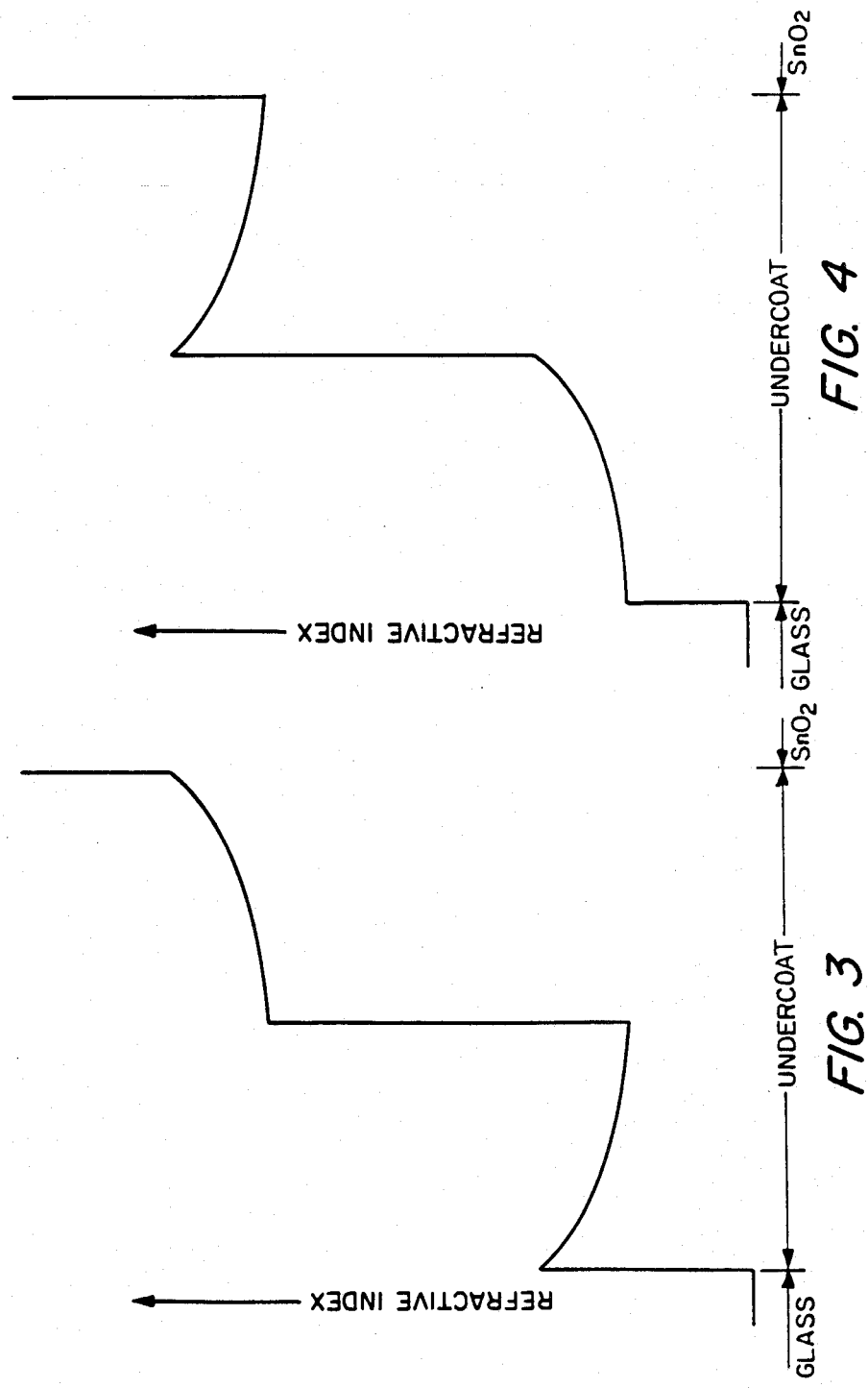

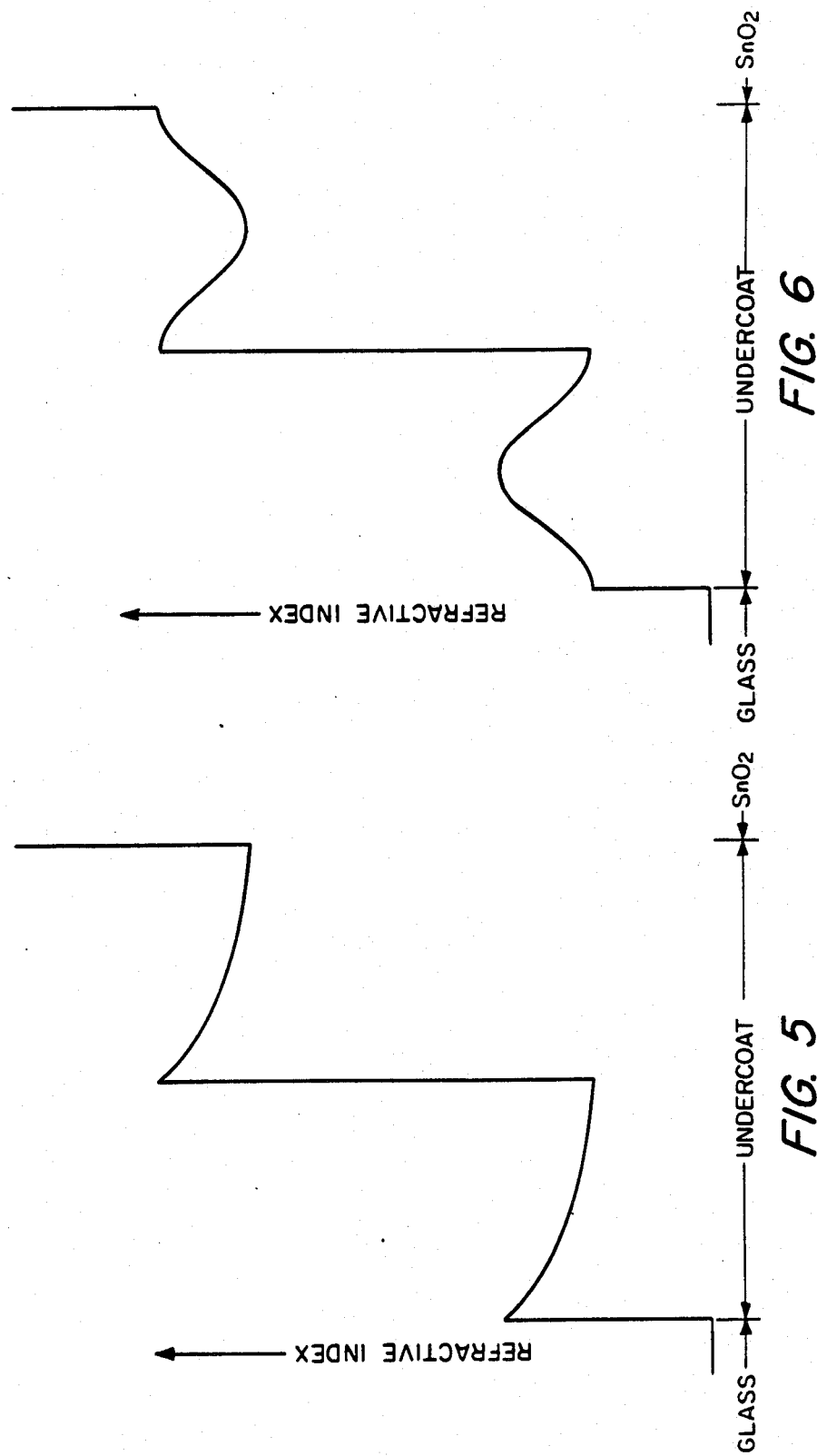

COATING PROCESS FOR MAKING NON-IRIDESCENT GLASS STRUCTURE

RELATED APPLICATION

This application is a Divisional Application of U.S. patent application Ser. No. 519,248 filed by Roy Gerald Gordon on Aug. 10, 1983 now U.S. Pat. No. 4,595,634 and entitled "Coating Process For Making A Non-Iridescent Glass Structure".

BACKGROUND OF THE INVENTION

This invention related to the coating of inorganic substrates such as glass with thin, non-iridescent coatings. Such coatings may consist primarily of fluorine-doped tin oxide of high reflectivity, especially to, far infra-red radiation and the heat carried by such radiation.

The presently-known art to which this invention most closely relates is found in U.S. Pat. Nos. 4,146,657; 4,187,336; and 4,206,252. The most pertinent of these patents is U.S. Pat. No. 4,206,252, issued on June 3, 1980.

The teachings of these three patents is incorporated by reference in the present application. In general, U.S. Pat. No. 4,146,657 disclosed a particularly valuable tin oxide coating material and a novel process for depositing the coating. It was next found that this improved coating was so effective with respect to its electrical and infra-red reflecting properties that it could be utilized on architectural glass at very low thicknesses (e.g., from 0.1 to 0.8 microns). Some undesirable iridescent effects were present at such thicknesses. U.S. Pat. No. 4,187,336 disclosed improved processes and products whereby these iridescent effects were largely eliminated by use of thin intermediate coatings which were of selected refractive idices and were positioned over the substrate, e.g. glass, and under the infra-red reflective coating. Finally, U.S. Pat. No. 4,206,252 disclosed an improved process whereby the intermediate coating could be applied as a gradient coating on a continuous production line such as those lines used in commercial sheet-glass manufacture, e.g. float-glass production lines.

In the process of U.S. Pat. No. 4,206,252 a gaseous mixture of reactants was fed to a reaction zone through which the hot substrate was moving. The mixture was chosen so that some reactants reacted and deposited on the substrate faster than others. Thus, as the substrate moved along, it encountered an infinite series of constantly-changing coating compositions. The result was that the coated glass product picked up a coating with, ideally, a constantly changing intermediate layer between the substrate and the conductive tin oxide coating.

The method utilized in the U.S. Pat. No. 4,206,252 coating process required substantial care and attention to adequately maintaining gas seals at the reaction zone through which the hot glass passed. The present invention derives from applicant's efforts to minimize the sealing problem in continuous-coating apparatus. As will be seen below, the resulting novel process not only solves the sealing problem, but also provides an excellent, anti-iridescent, coated glass product of novel construction. It is to be understood that the term "seal" as used herein does not define an extremely tight seal, but merely refers to practical means to minimize the loss of gaseous material from the reaction zone, and thereby redirect it to primary apparatus venting means.

SUMMARY OF THE INVENTION

It is a principal object of the invention to provide an improved continuous coating process for placing an anti-iridescent coating between a glass substrate and a thin overcoat of, e.g., tin oxide.

Another object of the invention is to provide such a process which utilizes gaseous reactants in a reaction zone through which the glass substrate continuously passes, but which is insensitive to leakage of reactants through the openings through which the glass passes.

Another object of the invention is to provide a novel coated glass structure which comprises a thin coating of far infra-red reflective material, and which can be continuously formed from a center fed coating apparatus.

Other objects of the invention will be discerned by those skilled in the art on their reading of the present disclosure.

In making the novel process invention, novel glass structures have been discovered which are non-iridescent but which differ, at least in their specific structure, form the non-iridescent coatings previously known.

The above objects, and the novel glass structure, have been substantially achieved by use of a centrally-fed process wherein two gaseous reactant compositions are fed into the reaction zone where the intermediate anti-iridescence coating (called an interlayer) is deposited on the glass. Each gaseous reactant composition is of a differing composition and each reactant composition moves along the glass towards an opposite end of the reaction zone. Thus the interlayer will consist of two sublayers, each of a composition dictated by the nature of the gaseous composition from which it is deposited. An important aspect of this procedure is that neither the reaction zone seal where the glass enters, nor the reaction zone seal where the glass exits, is required to seal a reactant composition which is rich in reactants. Only reaction compositions which are substantially depleted of critical reactant concentration before they reach these seals are used in the most favorable modes of the invention. This procedure makes unnecessary the use of gas-retaining pressure differentials, or other such expedients, at the seals. Indeed, it makes the seal construction generally less critical. There are a number of other advantages to the process: for example, the line speed of the glass can be higher than with the previous coating process.

By "substantial depletion" is meant that condition whereby insufficient reactants remain to cause a substantial difference in the optical properties of the glass should some leakage occur at the sealed ends of the reaction zone.

The preferred implementation of the above-described process depended upon the discovery of a coating which has a useful refractive index profile.

It has been discovered that excellent non-iridescent properties can be achieved utilizing two-stepped gradient coatings which themselves exhibit refractive indices between 1.6 to 1.7 (nearest the glass) and 1.8 to 1.9 (farthest from the glass) even when a specific gradient of one or both coatings runs contrary to the primary upward trend of the refractive index from the glass substrate to the tin oxide coating. Thus, surprisingly, it has been discovered that a particular modification of the twocomponent interlayer coats described in U.S. Pat.

No. 4,187,336 can be used with the process of the invention.

From the work evaluating the process disclosed herein, it has become clear that the precise shape or slope of the refractive index profile of ¼ wavelength layers need not be and particular shape. Thus, for example, the idealized and preferred slopes of FIG. 4 may be replaced by those of FIGS. 5, 6 or while still maintaining an adequate anti-iridescent effect on the finished infra-red reflective glass product.

All of these illustrated configurations, even those of surprising utility, may be considered species of my invention described in U.S. Pat. No. 4,187,336 wherein, for example, my iridescence-avoiding interlayer was composed of two ¼ wavelength layers averaging about 1.63 and 1.861 respectively in refractive index, respectively.

Thus, for example, the optical thickness of each of two ¼-wavelength layer components in an iridescence-avoiding interlayer will be calculated according to the method known in the art:

$$\frac{\text{design wavelength}}{(\text{refractive index})(4)} = \text{optical thickness}$$

A deviation of about 25% can be tolerated, but the process may be easily controlled well within such a limitation.

In practice the design wavelength is selected to be a visible wavelength of about 550 nanometers. Use of such a wavelength as a design criteria is satisfactory in designing anti-iridescent items.

It is to be understood that the process disclosed herein could also be used in combination with other process steps to achieve a suitable anti-iridescence interlayer construction. For example, were the interlayer composed of four sublayers, two center-flow configurations could be mounted in series and four-stepped sublayers were to be used to form the interlayer, a single-cost process like that described in U.S. Pat. No. 4,187,336 could be utilized to provide a third sublayers of appropriate thickness.

Nevertheless, it is believed that except for special circumstances, the most economical process is the two-sublayer embodiment described, for example, in FIG. 2.

Although the present disclosure specifically describes the process with respect to sublayers largely based on silicon and tin oxides, the same process can be readily adapted to deposition of the various sublayers including, for example, those based on mixtures of silicon oxide, aluminum oxides, zinc oxide, magnesium oxide, indium oxide, germanium oxide and gallium oxide, all as described in Table B of U.S. Pat. No. 4,187,336 as useful in deposition of sublayers having refractive indices between 1.62 and 1.65, i.e. useful for forming one of two sublayers most remote from at typical glass substrate. Also, the sublayer more remote from the glass can be formed from many mixtures including those described in Table C of U.S. Pat. No. 4,187,336.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

IN THE DRAWINGS

FIG. 1 is a schematic elevation view of apparatus constructed to carry out the process of the invention.

FIG. 2 is a schematic drawing of a coated glass sheet prepared according to the invention.

FIG. 3 illustrates a preferred scheme of forming an anti-iridescent layer according to the invention.

FIGS. 4, 5 and 6 are other coating scheme which may be carried out by the process of the invention.

Figure 7:
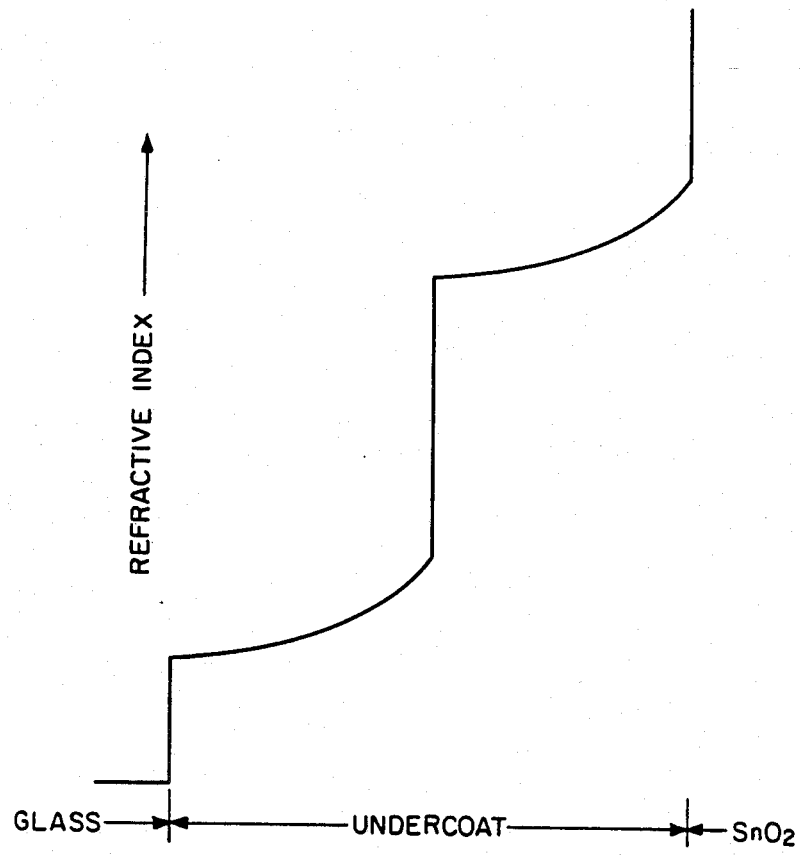
FIG. 7 illustrates that portions only of the interlayer can be descending refractive index.

Referring to FIG. 1, it is seen that coating apparatus 10 is arranged to receive a hot glass sheet along a process line which, for example, can be a float-glass-type processing line.

Apparatus 10 comprises an entry port 12 for glass sheet 14, a first coating-reactor zone 16, a second coating-reactor zone 18, and a glass exit port 20. Coating reactor zones 16 and 18 are supplied with fluid reaction mixture via gas inlet manifolds 22 and 24, respectively and gas feed orificies 26 and 28 respectively. The reactant mixture supplied via the flowpath comprising manifold 22 and gas feed orifice 26 provides a reaction mixture which flows counter currently along the glass in zone 16 progressing towards gas outlet port 30 and gas outlet manifold 32.

The reactant mixture supplied via a flowpath comprising manifold 24, and gas feed orifice 8 provides a reaction mixture which flows currently along the glass in zone 18 progressing towards gas outlet port 34 and gas outlet manifold 36. Each reactant mixture is so selected that it deposits a thin—usually ¼ wavelength in optical thickness—coating of the appropriate refractive index. In manufacture of the non-iridescent coatings, of particular interest to the inventor are a reaction mixture which will flow through zone 16, depositing a relatively low refractive index layer, and a reaction mixture which will flow through zone 18, depositing a relatively high refractive index layer. The reaction mixtures will be selected to be substantially depleted before reaching the outlet or inlet ports.

The overall length of the apparatus from gas inlet to gas outlet is conveniently selected to be about 12 inches. The apparatus is suspended from, or mounted on, support pipes 38. The reaction rates and other reaction zone conditions are substantially improved by maintaining those surfaces of apparatus 10 which are in the reaction zone at a relatively low temperature to inhibit deposition of coating material thereon. Thus, cooling fluid, say nitrogen gas, if fed into each of two cooling chambers 40, each associated with one of reaction zones 14 and 16. The cooling gases enter through ports 42 in cooling supply pipes 44. The gases are removed from the coating apparatus at exit port 46.

The space proximate the glass at entry port 12 and exit port 50 are equipped with seal flaps, conveniently constructed of pleated seals of flexible fiberglass fabric 52, to minimize leakage. However, when the reactants are properly selected so that they near effective depletion close to the exit ports, this sealing is not particularly critical to the process. Thermal insulation 56 helps to maintain the proper temperature for operation of the apparatus by separating the hot gas outlet manifold from the gas cooled housing 54. In practice the apparatus is suitably positioned to provide about 0.25-inch height to the gas flow over the glass substrate. Rollers 58 support the glass as it moves along the processing line in the manner well-known in the glass-making industry.

One suitable combination of coating reaction mixtures may be applied as follows, and comprises a first mixture of relatively low refractive index applied in zone 16, and a second mixture of relatively high refractive index applied in zone 18.

|  | Volume % |
|---|---|
| The first mixture comprises: | |
| 1,2 dimethoxytetramethyl disilane | 0.4 |
| tetramethyltin | 1.2 |
| Bromotrifluoromethane | 2.0 |
| Dry Air | balance |
| The second mixture comprises: | |
| 1,2 dimethoxytetramethyl disilane | 0.15 |
| tetramethyltin | 1.5 |
| Bromotrifluoromethane | 2.0 |
| Dry Air | balance |

The glass travels about 10 centimeters per second through the zone, entering the zone at about 580° C. The gas mixtures each entered at a rate of about 2 liters per second per meter of coater width, and at about 300° C. The surface of the reaction zone structure positioned above the glass is suitably maintained at about 350° C.

The deposited coating closely resembles, in profile, the coating illustrated in FIG. 3 wherein the downwardly-sloping segment of the line represents interlayer portion 60(a) of FIG. 2 and the upwardly-sloping segment of the line represents interlayer portion 60(b) of FIG. 2.

FIG. 2 represents a glass product 59 which is first coated according to the invention to have a dual iridescence suppressing intermediate coating 60 between a glass structure 64 and a thin tin-oxide coating 62.

It has been found desirable to utilize dialkoxypolysilanes in the process of the invention. Dialkoxy permethlpolysilanes, particularly methoxyterminated dimethoxypermethylpolysilanes, have beem valuable because they allow increased coating speeds and decreased flammability compared to tetramethyldisilane. Such methoxy materials are of the formula:

MeO(M$_e$Si$_2$)$_n$OMe wherein "n" is from about 2 to 10. Values of n of from 2 to 6 appear to allow excellent reaction and coating rates. The optimum number of silicon-bearing groups may differ with different deposition rates. Vapor pressure decreases with increasing values of n, and with given apparatus, will usually exhibit an upper limitation on the value of n which defines compounds that can be volatilized. For example, evaporating the dialkoxy compound into a nitrogen carrier gas as a diluent before mixing with air, would allow use of higher evaporation temperatures because the amount of oxygen would be reduced and less oxygen would be available for premature reaction with the silane compound. In practice, compositions comprising a mixture of reactants having different values of "n" can be used without any serious problems. It should be noted that the lower alkoxy compounds such as the preferred methoxy compounds often result in the deposition of a silicone-type material, i.e. substantial carbon-silicon bonds are left in the coating. The relative magnitude of this effect may differ substantially with changes in temperature and the presence of impurities. In any event, it does not interfere with the efficacy of the process nor products produced thereby, although the factor makes it prudent to monitor the refractive index of product produced under varying conditions to assure its refractive index is within suitable limits. However, the process described is one wherein the products of suitable index need only have approximately suitable optical thicknesses, say plus-or-minus 25% to provide suitable anti-iridescent effect.

It is advantageous if the initially-deposited material has at least about 60% silicon oxide, based on total oxide. If it does not, it is desirable to provide a thin, e.g. 10 to 100 angstroms anti-haze coating over the glass substrate under the dual interlayer.

After the dual-layer, anti-iridescence treatment has been applied to the coating, then a fluorine doped coating of tin oxide, preferably about 0.1 to 0.4 microns thick may be added to provide an effective reflection of far infra-red radiation and the heat associated with such radiation.

It should be understood that a special value of the invention is to allow the efficient manufacture of transparent sheeting which can be coated with an ultra thin, say 0.2 to 0.7 micron thick, coating of fluorine-doped tin oxide to serve as an infra-red reflecting sheet. The invention allows these objects to be achieved with glass substrates which are clear or of very light tints and, indeed, with glass substrates which are free of metallic tones and are free of gray, bronze or other such dark tones which themselves can substantially suppress visibility of iridescence.

The total coating thickness of the dual interlayer and the interlayer and the infra-red coating will be from 0.3 to 1 micron. Any thicker material will function merely to reduce the visible light transmission.

An anti-haze layer of amorphous material, preferably silicon oxide or silicon oxynitride, may be used between glass substrates and the dual interlayer. Silicon oxide is suitable and preferred.

The film of the interlayer closer to the glass will usually have an average refractive index of about that given by the idealized formula $$n_a = n_{sc}0.26 n_{gl}0.74$$

wherein $n_{sc}$ is the refractive index of an overcoating like tin oxide and $n_{gl}$ is the refractive index of the glass. The more remote interlayer will have an average refractive index given by the formula $$n_b = n_{sc}0.74 n_{gl}0.26$$

wherein $n_{sc}$ is the refractive index of an overcoating like tin oxide and $n_{gl}$ and is the refractive index of the glass. These indices will calculate between about 1.6 and 1.7 for $n_a$ and between about 1.8 to 1.9 for $n_b$ when an overcoating has a refraction index of about 2 and the glass has a refractive index of about 1.5.

It will be apparent to those skilled in the art that various changes and further modifications of the invention may be made therein without departure from the spirit of the invention or from the scope of the appended claims.

What is claimed is:

1. A process for manufacturing a glass sheet of the type that has a thin transparent overlayer of electrically conductive oxide thereon, and a thin iridescence-diminishing transparent interlayer over said glass and under said oxide, said process comprising the steps of (a) forming said interlayer of two sublayers, each about ¼ wavelength in optical thickness, based on a 550 nanometer design wavelength, but with one sublayer having a refractive index higher than that of the other sublayer (b) by flowing two reaction mixtures across said glass from about the center of a reaction zone through which the glass is being moved and (c) so segregating the flow patterns of each of said mixtures that one said reaction mixture flows countercurrent to movement of said glass and the other reaction mixtures flow concurrently to movement of said glass.

2. A process as defined in claim 1 wherein said reaction mixtures and flow rates and glass temperature are so selected that the reaction mixtures are largely depleted as they reach either end of said reaction zone.

3. A process as defined in claims 1 or 2 wherein at least one reaction mixture is selected so that it forms an interlayer which has a refractive index above that of the glass, but which refractive index falls as said interlayer thickness increases from said glass.

4. A process as defined in claim 1 which comprises coating said interlayer on a transparent substrate which is formed of clear glass or glass of light tint, said sheeting being free from metallic, gray or bronze and other dark-toned tones capable of themselves substantially suppressing the visibility of iridescence.

5. A process as defined in claim 1 wherein said interlayer coating and a subsequent tin oxide coating step together form a total coating of from 0.3 to 1 micron in thickness.

6. A process as defined in claim 1, 4 or 5 comprising the step of depositing an amorphous anti-haze layer immediately over said glass.

7. A process as defined in claim 1, 4, 5 or 6 wherein said interlayer coating step comprises depositing two layers including:
(a) one film closer to the glass and having an effective refractive index about that given by the formula $$n_a = n_{sc}0.26 n_{gl}0.74$$

and (b) a second film closer to said subsequent coating and having an effective refractive index about that given by the formula $$n_b = n_{sc}0.74 n_{gl}0.26$$

wherein said $n_{sc}$ is the refractive index of said first coating and $n_{gl}$ the refractive index of the glass.

8. A process of claim 6 wherein said amorphous film is silicon oxide.

9. A process as defined in claim 1, 4 or 5 wherein said coating steps are carried out to such thickness and with such materials that a color saturation value below 8 is achieved for said structure.

10. A process as defined in claim 1, 4 or 5 wherein said precoating comprises depositing two layers including
(a) one layer, closer to the glass and having an effective average refractive index in a range of about 1.6 to 1.7
(b) a second layer, closer to said subsequent coating and having an effective average refractive index in a range of about 1.8 to 1.9,
and wherein said subsequent coating has a refractive index of about 2, and said glass has a refractive index of about 1.5.

11. In a process for coating a substrate which is moving into and out of a reaction zone through sealed (but non hermetically sealed) ports by contacting said substrate with a mixture of gaseous reactants in said reaction zone, the improvement of introducing said reaction mixture at the central portion of the reaction zone and causing said reaction mixture to flow along said substrate toward said sealed portion at such a rate that the reactants are substantially depleted before they reach the proximity of said non-hermetically sealed ports.

* * * * *